March 16, 1971  JINTARO SHIBATA  3,570,294
PIPE ROLLING EQUIPMENT
Filed Dec. 4, 1968  4 Sheets-Sheet 2

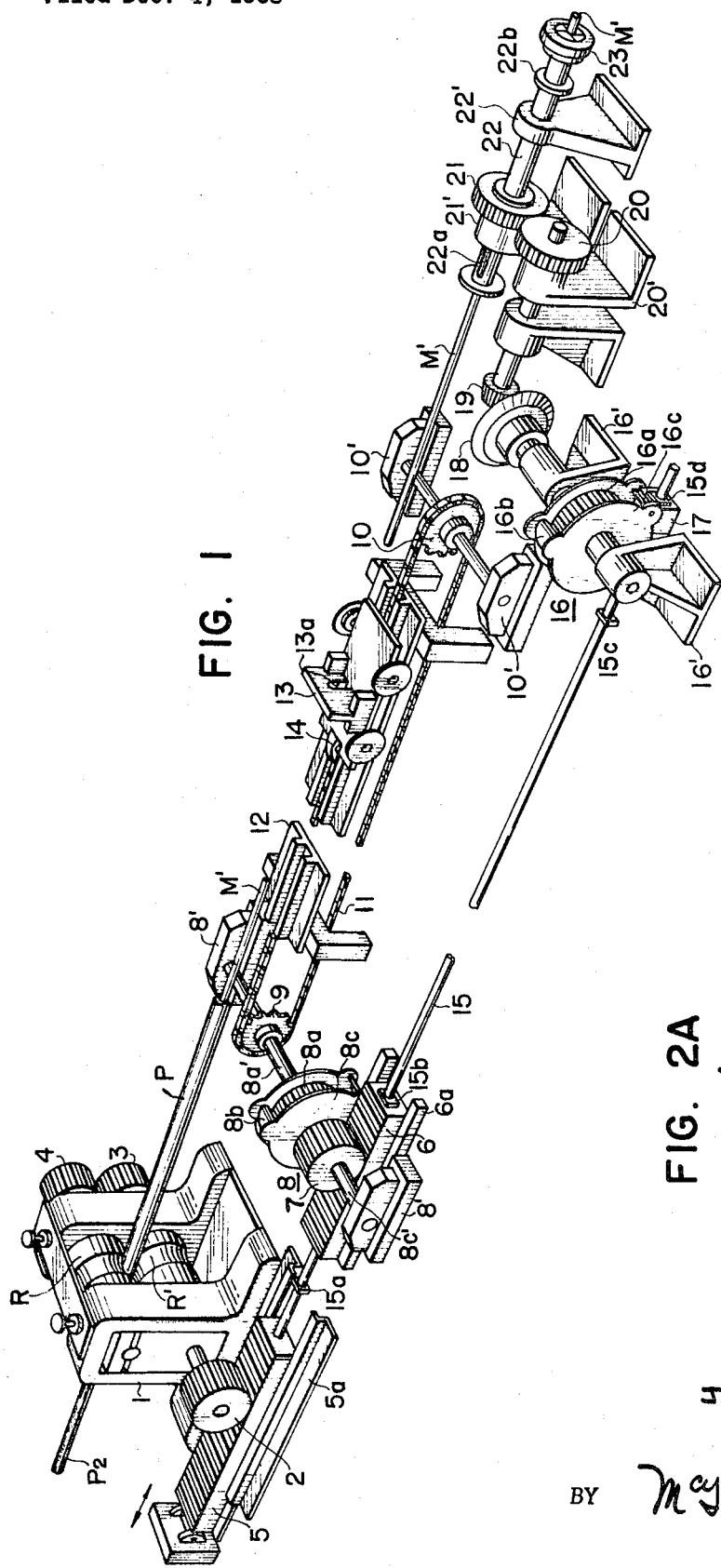

INVENTOR
JINTARO SHIBATA

BY

ATTORNEYS

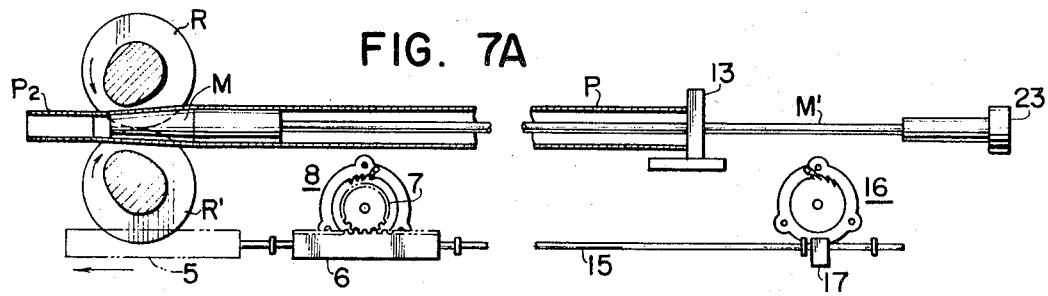
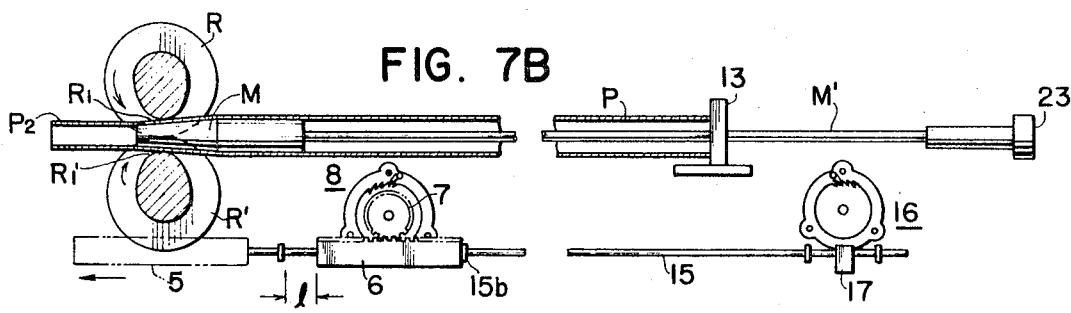
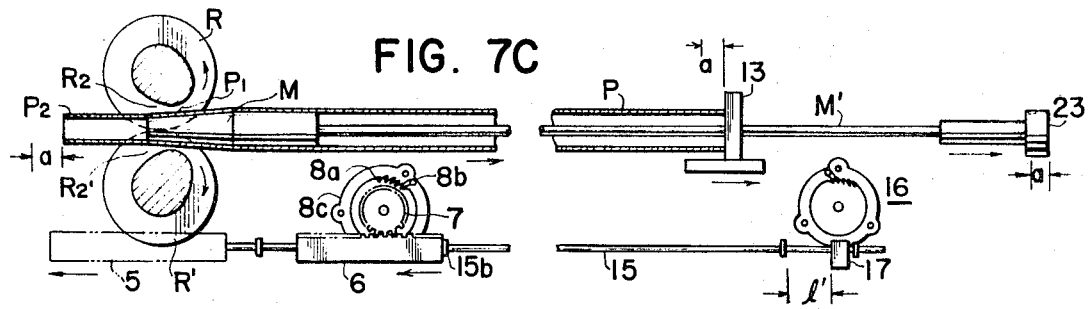
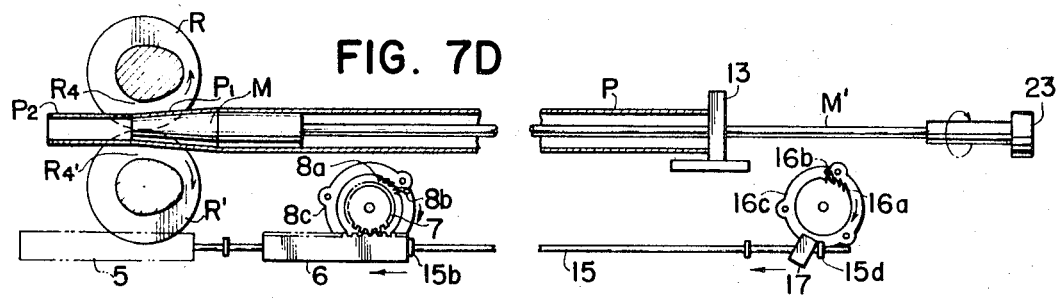

United States Patent Office 3,570,294
Patented Mar. 16, 1971

3,570,294
PIPE ROLLING EQUIPMENT
Jintaro Shibata, 22–12 Ohmori-Kita 1-chome, Ohta-ku, Tokyo, Japan
Filed Dec. 4, 1968, Ser. No. 780,983
Claims priority, application Japan, Dec. 6, 1967, 42/77,940
Int. Cl. B21b 17/10
U.S. Cl. 72—208                    7 Claims

ABSTRACT OF THE DISCLOSURE

A pipe rolling mill for shrinkage of a metallic raw pipe to a required external diameter and thickness, wherein a raw pipe, having inserted therein a core rod or mandrel, is pinched between facing rollers. The pipe is initially deformed to an eccentric cross section and rotated through a certain angle while being pressed and drawn backwards. Then the said pipe is reduced along the mandrel surface while being drawn forwards, and its worked portion is extracted from the mandrel and pushed out by a pressing unit, the pipe thus gradually being rolled. The operation is automatically and continuously carried out.

SUMMARY OF THE INVENTION

The present invention relates to a pipe rolling mill for shrinkage of a metallic raw pipe to a required external diameter and thickness, wherein a raw pipe, having inserted a core rod or mandrel, is pinched between facing rollers. The pipe is initially deformed to an eccentric cross section and rotated through a certain angle while being pressed and drawn backwards. Then the pipe is reduced along the mandrel surface while being drawn forwards, and its worked portion is extracted from the mandrel and pushed out by a pressing unit, the pipe thus gradually being rolled. The operation is automatically and continuously carried out.

The apparatus embodying the invention includes a pair of facing rolls having concave peripheries. Through an arc of substantially 180°, each roll is divided into a drawing portion, which is centered on the arc, a pair of slow drawing portions on either side of the first-mentioned drawing portion and a pair of idle portions which are at substantially 90° from the first-mentioned drawing portion.

Each roller has a gear secured to rotate therewith, and the two gears intermesh for conjoint rotation. The bottom roller has a second gear secured thereto which meshes with a reciprocable driving rack. Through a lost motion connection, this rack is interconnected with a following rack and with a follower arm. The following rack meshes with a gear for operating a pawl of a first ratchet mechanism, and the follower is connected to means for operating a pawl of a second ratchet mechanism.

The gear engaged with the following rack has secured to rotate therewith a chain sprocket engaged with an endless chain trained over a second chain sprocket and a pressing unit is secured to a run of the chain to be moved reciprocally along rails. The two ratchet mechanisms carry out pressing and rotation movements for the raw pipe, and the pressing unit is arranged to engage the end of the raw pipe. Through bevel gearing, the ratchet mechanism disposed furthest from the drawing rolls operates a pipe rotating chuck means to rotate the pipe in steps of substantially 90°. The drawing rolls are also operated through arcs of 90° from each side of the center position wherein the drawing portion is in contact with the pipe. A mandrel is connected to the chucking means and is engaged in the interior of the raw pipe, this mandrel being reciprocable longitudinally of itself in accordance with the particular drawing step then being performed.

The lost motion mechanism includes an elongated rod connected to the driving rack and having a first pair of stops thereon cooperable with the follower rack and a second pair of stops cooperable with the follower.

BRIEF DESCRIPTION OF THE DRAWINGS

In the following, an example embodying this invention will be explained with reference to the drawings, in which:

FIG. 1 is a broken perspective view of the entire pipe rolling equipment embodying this invention;

FIGS. 2A and 2B are broken plan views of said equipment showing the condition of the raw pipe during forward and backward drawing, respectively;

FIG. 7A to FIG. 7H are explanatory part elevation and part sectional views illustrating the sequence of operation of the equipment.

DESCRIPTION OF A PREFERRED EMBODIMENT

Figure 3:
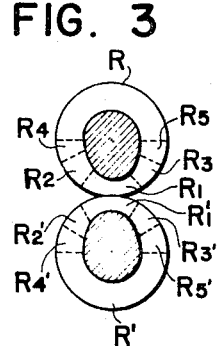
FIG. 3 is a side elevational view of a pair of facing rollers for drawing the pipe.
Figures 4A, 4B:
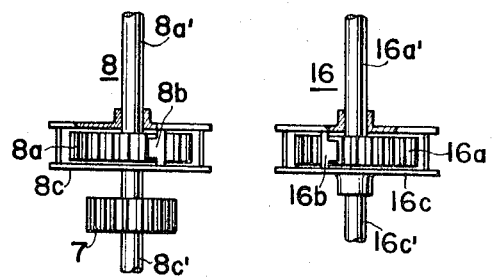
FIGS. 4A and 4B are enlarged plan views, partly in section of ratchet mechanisms acting to press and rotate a raw pipe.

In the drawings, 1 is a roll stand and R, R' are eccentric form concave rolls arranged inside the stand in superposed relation and facing each other to make contact with the pipe, on the semi-circle of these rolls, there are formed, respectively, concave drawing portions $R_1$, $R'_1$ each having a radius equal to that of the required pipe external radius, slow drawing portions $R_2$, $R'_2$, $R_3$, $R'_3$ on opposite sides of portions $R_1$, $R'_1$, respectively, each having a radius larger than that of portions $R_1$, $R'_1$, and idle portions $R_4$, $R'_4$, $R_5$, $R'_5$ on opposite sides of the slow drawing portion and nearly at a right angle to the throttling portions $R_1$, $R'_1$, the idle portions each having a radius larger than that of the raw pipe (refer to FIG. 3). Gears 3 and 4 are secured to rotate with rolls R and R' respectively, and mesh with each other. A gear 2 is also secured to rotate with lower roll R', and this gear meshes with a driving rack 5, the arrangement being such that rolls R and R' are oscillated through an arc of 180° centered on the drawing portions $R_1$ and $R'_1$.

The driving rack 5, has a reciprocating motion through a certain distance by means of a crank mechanism etc. (omitted in the drawing). Rack 5 is interconnected with along operating rod 15, on which are provided stoppers 15a and 15b, 15c and 15d at two positions spaced along rod 15. Stoppers 15a and 15b are operatively associated with the following rack 6, and stoppers 15c and 15d are operatively associated with a follower 17. Each pair of stoppers is spaced apart a distance greater than the length of the associated rack or follower as measured along rod 15, so that a lost motion connection is provided. Rack 6 is associated with a ratchet mechanism 8 and follower 17 is associated with a rachet mechanism 16, these ratchet mechanisms being provided for the purpose of pressing and rotating the raw pipe responsive to reciprocation of rack 5.

The ratchet mechanism unit 8 includes a chain sprocket 9 fixed on the shaft 8a' of its ratchet 8a, and a shaft 8c' secured to a support plate 8c of its pawl 8b and fixed to a pinion 7 engaged with following rack 6 inserted between stoppers 15a, 15b. A set of rails 12 extends along an endless chain 11 engaged with the sprocket 9 and a rear sprocket 10. A pressing unit 13 is mounted for free movement along rails 12 and has a pawl 14 or hook engageable with chain 11.

Ratchet mechanism unit 16 is constituted so as to act in an angular direction opposite to the ratchet 8a, by the follower 17 loosely inserted between the stoppers 15a, 15b. Follower 17 is secured upon the supporting plate 16c of pawl 16b, and bevel gear 18 is pivoted on the shaft 16a' of the ratchet 16a. A bevel gear 19 is engaged with, secured on bevel gear 18 and a gear 20 of the same shaft as gear 19 is engaged with a gear 21 which, has a key 21a engaged in a key slot 22a formed in shaft 22 of chuck 23. The chuck 23 grips the back end of core shaft M' having a core rod or mandrel M, tapered in accordance with the required external diameter at its front end. The previously mentioned key slot 22a receiving the key 21a of gear 21, for relative sliding movement of gear 21 and shaft 22, is formed in the forward portion of shaft 22. A stopper 22b is mounted on the rear portion of shaft 22 and is engageable with the support 22' for shaft 22. Stopper 22' is so located that, when it engages support 22', mandrel M on the front end of shaft M' is at a position between rolls R and R'. Shaft M' extends through the interior of the raw pipe, by virtue of extending through an aperture 13a of pressing unit 13.

Figure 5A:
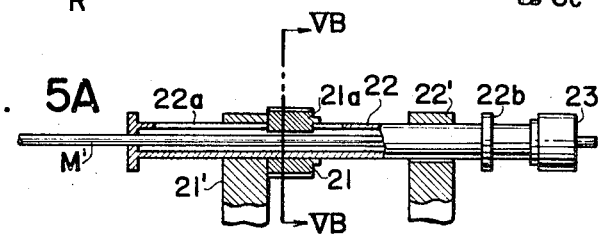
FIG. 5A is an enlarged sectional drawing showing the relation between a chuck shaft and a gear mounted thereon.
Figure 5B:
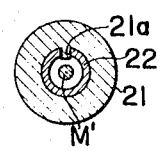
FIG. 5B is an enlarged sectional view on the line VB—VB of FIG. 5A.
Figure 6A:
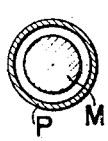
FIG. 6A to FIG. 6E are axial sectional views showing the rolling work progression from the raw pipe to the finished product by the equipment of the invention.

In the drawings, FIGS. 5a and 6a are rack guides, 8', 16" are bearings of supporting plate for shafts 8c', 16c" and ratchet shafts 8a', 16a' in the ratchet mechanisms, and 20', 21' are gear stands. The supports for the shaft of sprocket 10 are indicated at 10', and the support for the shaft carrying bevel gear 19 and gear 20 is indicated at 20'.

The eccentric cross section of the pipe, formed as an intermediate step during the process of the invention, is illustrated at $P_1$, and the finished rolled pipe is indicated at $P_2$, with the raw pipe being indicated at P. The distance through which the pipe is reciprocated when pressed by the rolls R and R' is indicated at "a," and the increased length of the pipe, resulting from the rolling operation, is indicated at b. The distance of free movement of rod 15 with respect to rack 6 and follower 17, respectively, are indicated at $l$ and $l'$.

The present invention operated in such a manner that, as described above, rolls R, R' of the rolling mill are conjointly rotated alternately in opposed directions by reciprocating motion of the driving rack 5. Thereby the ratchet mechanism units 16, 8 are operated to carry out pipe rotation and pipe pressing action in alteration. Thus the raw pipe is pressed and worked out to the required product.

The rolls R and R', which are mounted in stand 1 one above the other and in facing relation to contact each other, are conjointly rotated by gears 3 and 4 when gear 2 is rotated by driving rack 5. Thus, if rack 5 is advanced, to the left as viewed in FIG. 1, rolls R and R' are rotated in a direction to move pipe P inwardly or toward the right, as viewed in FIG. 1. If rack 5 is retracted, rolls R and R' are rotated in the opposite direction to move pipe P outwardly or to the left. When pipe P, squeezed between rolls R and R' and pressed against mandrel M is moved inwardly, it is drawn along the mandrel M by the drawing portions $R_1$, $R_1'$. The following rack 6, being positioned between the front stoppers 15a, 15b of the operating rod 15 interlinked with the driving rack 5, has a selected "lost motion" distance $l$. Hence, if the operating rod 15 progresses with operation of driving rack 5 and the stopper 15b makes contact with the following rack 6 to push and advance it, the pinion 7 rotates to retract pawl 8b of ratchet mechanism 8 along the ratchet 8a. Also the follower 17, loosely inserted between the rear stoppers 15c, 15d of rod 15, has a selected "lost motion" distance $l'$. When follower 17 is pushed by the stopper 15d with the progress of operating rod 15, so as to turn plate 16c, the ratchet 16a engaged with the pawl 16b of ratchet mechanism 16 is rotated. Thus the chuck shaft 22 is rotated by 90° by gears 20, 21 through bevel gears 18, 19, and together with mandrel M. Next, if the driving rack 5 is retracted, the rolls R, R' rotate in the direction to advance pipe P, and, after rod 15 is retracted through the distance $l$, stopper 15a engages following rack 6 to rotate gear 7 in a direction such that ratchet 8a, engaged by pawl 8b. is rotated.

Figure 2B:
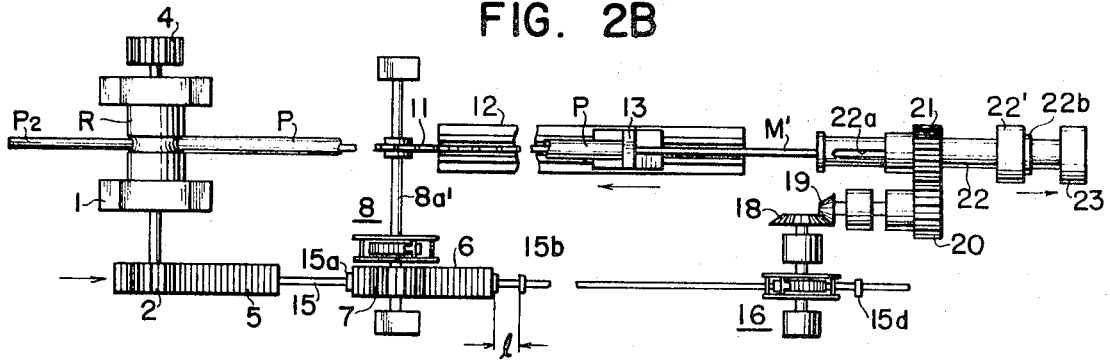

By virtue of the rotation of the carrier for pawl 8b, pinion 9 is rotated through shaft 8a', to draw the upper run of this chain toward the roll stand. As bushing unit 13 carries pawl 14 which is engaged with chain 11, unit 13 is also moved forwardly or to the left, as viewed in FIGS. 1 and 2B. After a predetermined motion of rod 15, stopper 15c engages follower 17 to rotate the carrier for pawl 16b is thus retracted along ratchet 16a, and no motion of the gearing 20 and 21 occurs.

This equipment carries out continuously and automatically the above operation and one stroke of the driving rack 5, in its reciprocating motion, is equal to a distance sufficient to rotate the rolls R, R' by a half-revolution (180°). The arrangement is such that ratchet mechanism 8 operated after the drawing portions $R_1$, $R_1'$, are in press-contact with the raw pipe P, and also ratchet mechanism 16 is operated at the time of the rolls have their idle portions $R_4$, $R_4'$, $R_5$, $R_5'$ adjacent the pipe.

A detailed description of one complete operation of the apparatus will now be given with particular reference to the explanatory drawings shown in FIGS. 7A through 7H.

In the first place, both the following rack 6 and follower 17 have free or lost distances of $l$, $l'$, respectively, between the associated stoppers and do not work at all in the condition of FIG. 7A. When the driving rack 5 is advanced to rotate rolls R, R' in a direction to move pipe P inwardly, so that throttling portions R, $R_1'$ make pressing contact with raw pipe P to begin pressing-work, the stopper 15b makes contact with the following rack 6 (FIG. 7B) As soon as the raw pipe P moves inwardly while being pressed and drawn by the drawing portions $R_1$, $R_1'$, the rack 6 is advanced by pressure of stopper 15b. Thus pawl 8b is released from ratchet 8a and drawn downwardly thereover. This releases the pressing unit 13 to be pushed inwardly by the raw pipe through a distance "a" moving the upper run of chain 11 to the right (FIG. 7C).

Figure 6B:
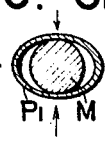

Core rod or mandrel M inside pipe P is withdrawn so that the drawing portion of pipe P is deformed from the circular cross section of FIG. 6A to the elliptical cross section of FIG. 6B by the slow drawing portions $R_2$ and $R_2'$ of rolls R and R', respectively. After the rolls R and $R_2'$ have rotated sufficiently so that idle portions $R_4$ and $R_4'$ are adjacent the pipe, follower 17, engaged by stopper 15a, is moved through the distance $l'$. Through pawl 16b, ratchet 16a is rotated through 90° clockwise.

The mandrel M and pipe P, together with gear 21, are rotated through 90°, gear 21 having a key 21a engaged in the key slot 22a of chuck shaft 22. Such rotation is effected by the drive including bevel gears 18 and 19 and gear 20. Correspondingly, the pipe P is rotated from the position of FIG. 6B to the position of FIG. 6C wherein the elliptical form has its longer axis extending vertically.

Figure 7E:
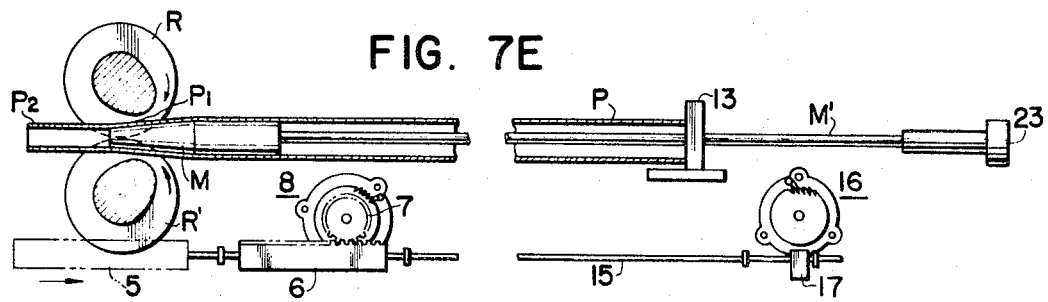
Figure 7F:
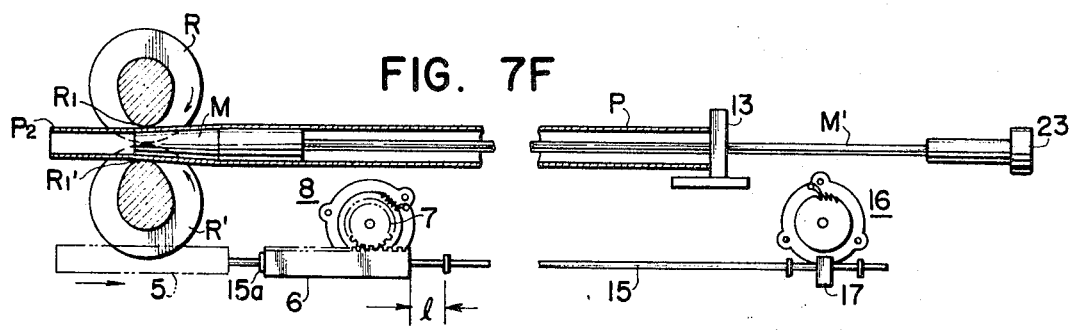
Figure 7G:
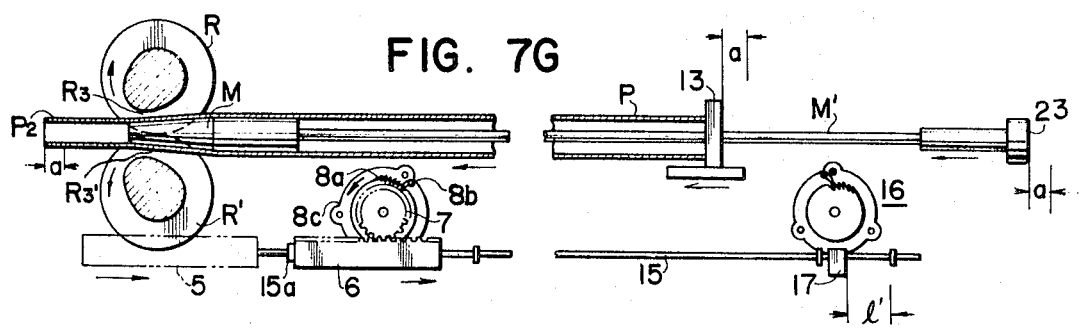

Next, as the driving rack 5 begins to retract, the rolls R, R' rotate in a direction to advance pipe P (FIG. 7E) and as the drawing portions $R_1$, $R_1'$ again press the raw pipe, the stopper 15a makes contact with the rack 6 (FIG. 7F). As the rolls press the above drawn eccentrically formed portion $P_1$ to work up forwardly along the surface of core or mandrel M, the raw pipe is advanced by the distance "a" while being reduced in diameter. The rack 6, now being retracted, rotates forwards the ratchet 8a counterclockwise through pawl 8b and pinion 7, so that the pressing unit 13 is advanced by the distance "a" (FIG. 7G). In this, the mandrel M is advanced until abutment 22b engages support bed 22'. Mandrel M is thus engaged with pipe P in the initial position relative to the roll stand 1. Thus, when rolls R, R' come to the position wherein idle portions $R_5$, $R_5'$ are adjacent the pipe from the position wherein slow drawing portions $R_3$, $R_3'$ are adjacent the pipe the pressing unit 13 is advanced by the ratchet 8a which is rotated by the further retracting rack 6.

Figure 6C:
Figures 6D, 6E:
Figure 7H:
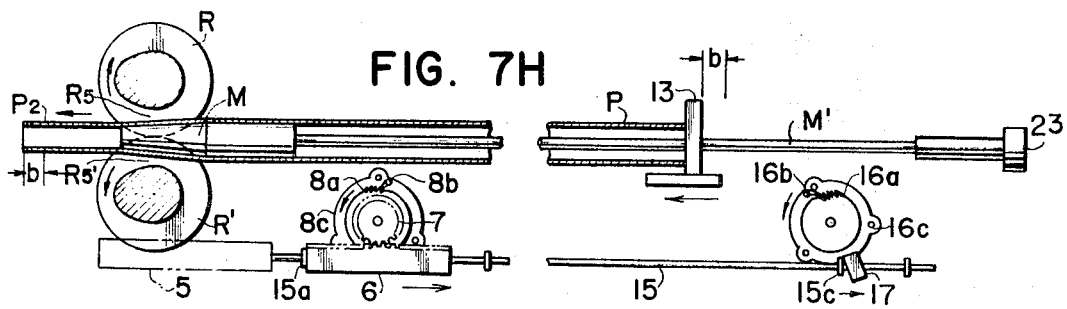

This moves only raw pipe P to push rolled portion $P_2$ outwardly from mandrel M and through the distance b (FIGS. 7H, FIG. 6C and FIG. 6B). In this operation, while follower 17 is engaged and moved by stopper 15c, there is no movement of ratchet 16a as pawl 16b is drawn rearwardly or counterclockwise thereover.

In the above, the working conditions at respective portions of the process have been explained, in order, with reference to the reciprocating cycle of the equipment.

With the invention apparatus, the working of the pipe is performed automatically and continuously in such a manner than one stroke of driving rack 5 corresponds to a one-half rotation of rolls R and R'. The speed of operation of pressing unit 13 is always maintained coordinated with the speed and direction of movement of the raw pipe, and is also so regulated that the raw pipe may be turned accurately through 90° by means of the mentioned gearing. Consequently, errors in operation are prevented. Additionally, as the raw pipe once deformed to an ellipse is then reduced to a purely circular ppie having a required external diameter, there is no unreasonable stress in the working process. Thus, the apparatus of the invention produces fine products which have neither strains nor wrinkles, and which can be easily produced, thus contributing greatly to the efficiency of metal working operations.

What is claimed is:

1. Pipe working apparatus, for reducing a pipe to a preselected outer diameter, comprising, in combination, a pair of pipe working rolls having transversely concave peripheries conjointly defining a pipe receiving opening; gearing interconnecting said rolls for conjoint rotation in opposed angular directions; a semi-circle of the concave periphery of each roll being divided into an arcuate pipe drawing portion centered on the semi-circle, first and second arcuate slow drawing portions, one on either side of said centered portion, and first and second arcuate idle portions each extending from a respective slow drawing portion to substantially the ends of the semi-circle; a mandrel positioned inside a pipe in said opening; operating means operatively connected to said rolls to oscillate said rolls conjointly through a semi-circular arc centered on said pipe drawing portions; said operating means, during the forward stroke of each oscillation, oscillating said rolls to engage said pipe drawing portions with a pipe in said opening to deform the pipe, inwardly along said mandrel, from a circular section to an oval section, and then to successively engage said first slow drawing portions and said first idle portions with the pipe; pipe rotating means operable by said operating means, when said first idle portions are engaged with the pipe, to rotate the pipe through 90°; said operating means, during the return stroke of each oscillation, oscillating said rolls to engage said pipe drawing portions with the pipe to deform the pipe, outwardly along said mandrel, from said oval section to a circular section having the preselected outside diameter, and then to successively engage said second slow drawing portions and said second idle portions with the pipe; and a pipe pusher means operable by said operating means, when said second idle portions are engaged with the pipe, to move the pipe outwardly through a preselected distance to advance the worked portion of the pipe beyond said opening; said operating means comprising a driving rack reciprocable parallel to the pipe, and a gear engaged with said driving rack and connected to rotate with one of said rolls.

2. Pipe working apparatus, as claimed in claim 1, in which said pipe rotating means and said pipe pusher means each include a respective ratchet mechanism having a respective rotatable ratchet and a respective pawl; lost motion means connecting both respective pawls to said operating means; each pawl, when operated, stepping its associated ratchet in an angular direction opposite to the angular direction in which the other pawl steps its associated ratchet.

3. Pipe working apparatus, as claimed in claim 2, in which the ratchet mechanism of said pipe rotating means includes a rotatable pawl carrier and an apertured follower secured to said pawl carrier; the ratchet mechanism of said pipe pusher means including a follower rack, a gear engaged with said rack and a rotatable pawl carrier secured to rotate with said gear; said lost motion means including a rod connected to said driving rack and extending through said follower rack and through said follower, a first pair of stops secured on said rod on opposite sides of said follower rack and spaced apart a distance greater than the length of said follower rack, and a second pair of stops secured to said rod on either side of said follower and spaced apart a preselected distance.

4. Pipe working apparatus, as claimed in claim 3, in which said pipe pusher means includes a pair of rails extending parallel to the pipe; a pipe pusher mounted on said rails for movement therealong; an endless chain extending parallel to said rails and trained over a drive sprocket and a driven sprocket; said drive sprocket being rotatable by the ratchet mechanism of said pipe pusher means; means on said carriage operable to connect said carriage to the upper run of said chain; said carriage abutting the inner end of a pipe in said opening.

5. Pipe working apparatus, as claimed in claim 3, in which said pipe rotating means includes a hollow shaft; means rotatably mounting said hollow shaft; a chuck secured to said hollow shaft; a mandrel rod secured to said mandrel, extending through said hollow shaft and gripped by said clutch; and gearing connecting said hollow shaft to the ratchet of the ratchet mechanism of said pipe rotating means.

6. Pipe working apparatus, as claimed in claim 5, in which said hollow shaft is formed with a key slot extending longitudinally thereof; said last-mentioned gearing including a gear on said hollow shaft having a key engaged in said slot, whereby said hollow shaft may be displaced axially relative to said last-named gear.

7. Pipe working apparatus, as claimed in claim 6, in which said hollow shaft is rotatably supported in a stand; and a stop on said hollow shaft engageable with said stand and operable to limit movement of said hollow shaft in a direction toward said rolls.

References Cited
UNITED STATES PATENTS

| | | | |
|---|---|---|---|
| 1,810,885 | 6/1931 | Neuberth | 72—208 |
| 2,247,863 | 7/1941 | Tiedemann | 72—189X |
| 2,680,391 | 6/1954 | Kaiser | 72—189 |
| 2,703,999 | 3/1955 | Gille | 72—208 |
| 2,923,187 | 2/1960 | Bengtsson | 72—214X |
| 3,274,816 | 9/1966 | Held | 72—208X |
| 3,416,346 | 12/1968 | Arrington | 72—208X |

MILTON S. MEHR, Primary Examiner

U.S. Cl. X.R.

72—189, 214